United States Patent Office 2,705,162
Patented Mar. 29, 1955

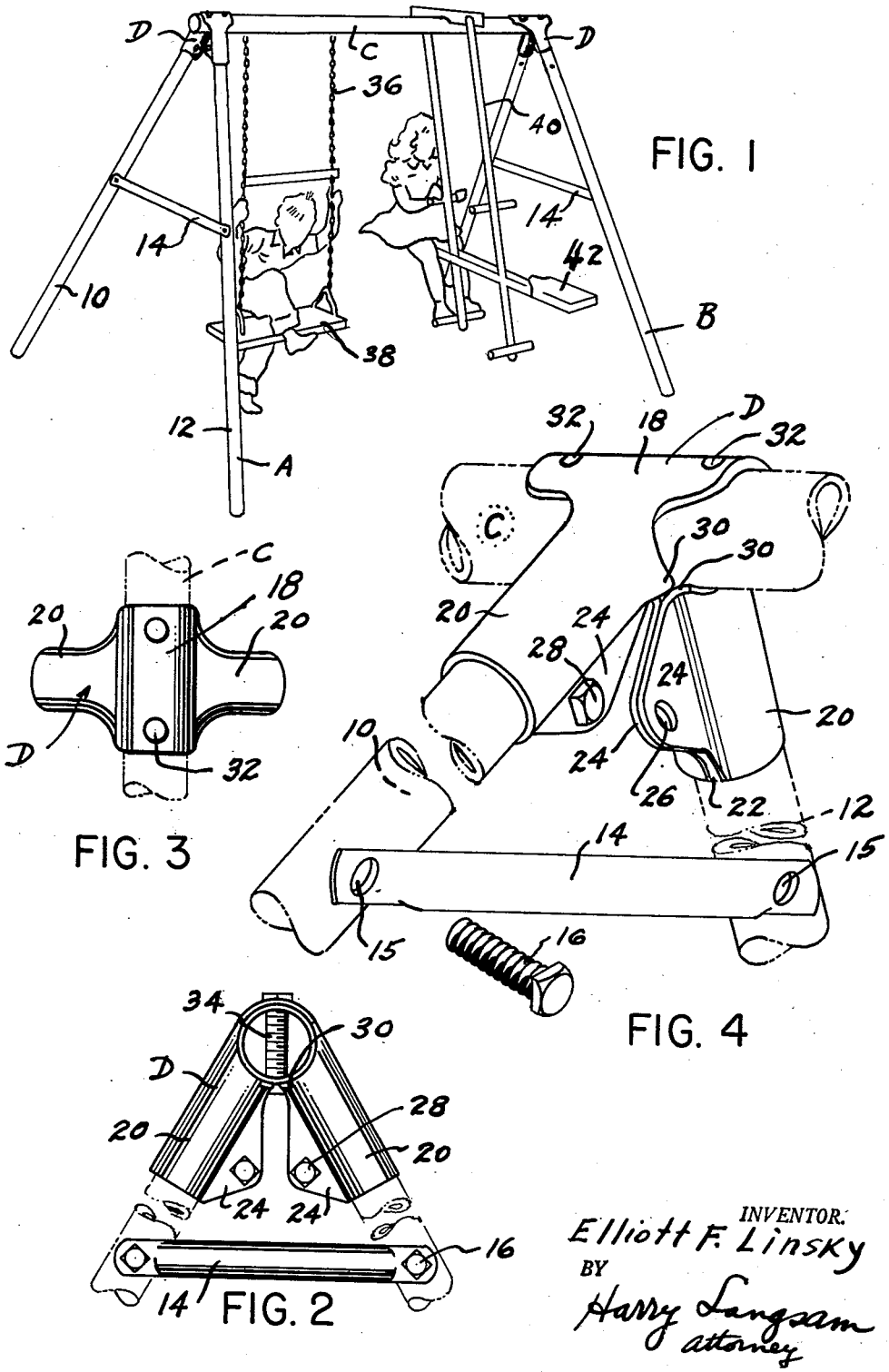

2,705,162

INTEGRAL COUPLING MEMBER

Elliot F. Linsky, Philadelphia, Pa.

Application August 29, 1952, Serial No. 307,071

1 Claim. (Cl. 287—54)

This invention relates to a support means, and it particularly relates to a support means which comprises a pair of angularly disposed legs for supporting a bar such as is used to support swings, see-saws or the like.

Heretofore, the supporting legs for a swing support bar or the like have generally been secured to the bar by means of bolts, rivets, studs or similar connecting means. The bolts, rivets or studs have, during a comparatively short period of use under the heavy vibrating stress of children's games, always tended to work loose or to fall out altogether, thereby making the device unstable and unsafe for the children who use it.

The present invention has for its purpose to solve the above problem.

One object of my invention is, therefore, to provide a rigid support means for a bar which is subject to much vibration.

Another object of my invention is to provide a unitary one-piece joint of simple construction.

Another object of my invention is to provide a joint which will not work loose under constant stress.

Another object of my invention is to provide a support means for children's games which, although relatively light in weight, is strong and rigid in use.

Another object of my invention is to provide a support means which is adjustable both vertically and horizontally.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a perspective view showing the support in use to hold children's swings and the like.

Fig. 2 is a front elevational view of the joint between the angularly inclined legs and the support bar.

Fig. 3 is a rear elevational view of the joint shown in Fig. 2.

Fig. 4 is a perspective view of the joint shown in Figs. 2 and 3.

Referring now in greater detail to the drawings wherein similar reference characters refer to similar parts, I show in Fig. 1 a support for a swing wherein the features of this invention are embodied. The swing support consists of two angular support means A and B and a tubular horizontal bar C which is held between the angular supports. Each angular support means comprises two angularly positioned tubular legs 10 and 12, these legs being so arranged that they provide a broad base and form an apex at their junction with the horizontal bar. A brace bar 14 is connected at one end to leg 10 and at the other end to leg 12. This brace bar is in the form of a tubular member which is flattened at its ends. A hole 15 is provided in each flattened end of the brace bar and through each of these holes extends a bolt 16. This bolt also passes through aligned holes in each of the tubular legs and is provided with a nut to hold the brace bar firmly on the legs.

The legs 10 and 12 are connected to the bar C by means of a coupling member D. The member D comprises a substantially cylindrical saddle 18 which is a substantially cylindrical sheet of metal or the like of a size to closely fit the periphery of the bar C. The saddle is provided with oppositely positioned, integral, tubular socket members 20. The socket members are each inclined to the saddle by approximately 45 degrees and are split at their inner sides so that they may be compressed. This split is shown at 22. A pair of parallel ears 24 are integral with each socket member, one ear of each pair being disposed on opposite sides of the split. Corresponding holes 26 are provided in the ears for the purpose of receiving a bolt 28 therethrough. A suitable nut, not shown, holds each bolt in place. Each of the tubular socket members 20 is flared at its uppermost portion adjacent the parallel ears 24 to define a plurality of integrally formed flanges 30. The flared flanges 30 of one socket member are so spaced relative to the flared flanges 30 of the socket member that the bar C is normally barely able to slide through the space.

When it is desired to clamp the bar C tightly in position in the saddle, the bar is slid into the saddle and the brace bar 14 is tightly bolted to the legs 10 and 12. The brace bar is constructed in such a manner that the distance between the holes 15 is less than the corresponding space between the legs 10 and 12, so that when the bolts 16 are tightened in place through the holes 15 and the corresponding holes in the legs, the legs will be drawn toward each other. This results in a closing of the space between the oppositely disposed pair of flared flanges 30 so that a clamping action on the bar C results. The bar C is now firmly clamped in position in the saddle member without the use of any bolts, nuts or the like in the joint itself. However, holes 32 are provided in the saddle and corresponding holes are provided in the bar C so that if desired, bolts 34 can be inserted to provide an additional holding means.

In use, the legs 10 and 12 of support A are inserted in their respective sockets 20 and the bolts 28 are tightened to bring the ears of each socket together. This secures the legs within the sockets. The support B is assembled in similar manner. The bar C is then inserted within the saddle D of either support A or B and the other end of the bar C is thereafter inserted within the saddle of the other support. The brace bar 14 is then tightened to the legs to firmly clamp the bar C in position. If desired, the bolts 34 are also inserted.

The bar C may be adjusted longitudinally in the saddles of the supports A and B so that the area between these supports may be made wider or narrower. This may be done merely by loosening the brace bars 14 and sliding the bar C within the saddles. If desired, holes 32 may be provided throughout the length of the bar C so that the bolts 34 can be used in any position of adjustment.

After the bar C has been fixed in position in the supports, the chains 36 of a swing 38 and the support bars 40 of a see-saw 42 are secured on the bar C and the device is ready for use.

The joint between the legs and the support bar C is strong, rigid and non-rattling because only a minimum of bolts or other such separable connecting means are used since the sockets are integral with the saddle. The tubular construction of the legs and the horizontal bar and the very light but firm construction of the joint combine to form a portable but strong swing support which can be set up conveniently in anyone's back yard.

Although my invention has been described in considerable detail, such description is intended as being illustrative rather than limiting, since the invention may be variously embodied and the scope of the invention is to be determined as claimed.

I claim as my invention:

An integral coupling member comprising a saddle, the central portion of said saddle being arcuate and fitting over a bar, a pair of angularly positioned tubular sockets extending downwardly and outwardly from said central portion, said sockets being integral with said saddle, each of said tubular sockets being split along its entire lower side and being provided with radially extending parallel ears on either side of said split, each of said ears being perforated for a bolt to extend therethrough for the purpose of clamping the split socket about a leg, each of said tubular sockets being flared at its uppermost portion adjacent said ears to define a plurality of integrally formed flanges, said flanges and saddle being adapted to be tightened against said bar to substantially embrace the entire periphery of said bar.

References Cited in the file of this patent

UNITED STATES PATENTS

| | | |
|---|---|---|
| 598,596 | Elsoss | Feb. 8, 1898 |
| 714,402 | Sager | Nov. 25, 1902 |
| 911,370 | Bouslog | Feb. 2, 1909 |
| 1,223,717 | Mintz | Apr. 24, 1917 |
| 1,362,489 | Karschitz | Dec. 14, 1920 |
| 1,579,422 | Wempe | Apr. 26, 1926 |
| 1,647,762 | Wiseman | Nov. 1, 1927 |
| 2,110,718 | Shiley | Mar. 8, 1938 |
| 2,171,681 | Burke | Sept. 5, 1939 |

FOREIGN PATENTS

| | | |
|---|---|---|
| 929,297 | France | Dec. 22, 1947 |